US008752183B1

(12) United States Patent
Heiderich et al.

(10) Patent No.: US 8,752,183 B1
(45) Date of Patent: Jun. 10, 2014

(54) SYSTEMS AND METHODS FOR CLIENT-SIDE VULNERABILITY SCANNING AND DETECTION

(75) Inventors: Mario Heiderich, Bochum (DE); Gareth Heyes, Blackburn (GB); Abraham Aranguren-Aznarez, Bydgoszcz (PL)

(73) Assignee: Hoyt Technologies, Inc., Stowe, VT (US)

( * ) Notice: Subject to any disclaimer, the term of this patent is extended or adjusted under 35 U.S.C. 154(b) by 0 days.

(21) Appl. No.: 13/545,890

(22) Filed: Jul. 10, 2012

(51) Int. Cl.
*H04L 29/14* (2006.01)

(52) U.S. Cl.
USPC .............................................. 726/25; 726/22

(58) Field of Classification Search
None
See application file for complete search history.

(56) References Cited

PUBLICATIONS

Klein, DOM Based Cross Site Scripting or XSS of the Third Kind, 2005.*
Saha et al., Detection of DOM-based Cross-Site Scripting by Analyzing Dynamically Extracted Scripts, The 6th International Conference on Information Security and Assurance (ISA 2012), Apr. 2012.*
DOMinator Control Flow, Minded Security, Mar. 2011.*
Tripp et al., Hybrid Analysis for JavaScript Security Assessment, ACM, 2010.*
Galan et al., A Multi-agent Scanner to Detect Stored-XSS Vulnerabilities, IEEE, 2010.*

* cited by examiner

*Primary Examiner* — Minh Dinh
(74) *Attorney, Agent, or Firm* — Sheppard Mullin Richter & Hampton LLP (57) ABSTRACT

Various embodiments presented herein relate to scanning for and detecting web page vulnerabilities, including cross-site scripting (XSS). Some embodiments are configured to scan for and detect vulnerabilities of a target web page using a client-based approach, which may employ a remotely-controlled web browser application capable of generating a document object model (DOM) for the target web page as it is accessed. Some embodiments may scan for and detect web page vulnerabilities by monitoring the DOM associated with a targeted web page as one or more attack vectors are applied to the target web page. Certain embodiments are capable of detecting web page vulnerabilities independent of the complexity or presence of an event model, or obfuscation of the malicious code (e.g., XSS code). Target web pages that are scanned may include those associated with an application coded in a web browser-supported language, such a Rich Internet Application (RIA).

31 Claims, 6 Drawing Sheets

SYSTEMS AND METHODS FOR CLIENT-SIDE VULNERABILITY SCANNING AND DETECTION

FIELD OF THE INVENTION

The embodiments described herein relate to web site security, and more particularly, various embodiments relate to crawling web sites and scanning for vulnerabilities associated with the web site.

DESCRIPTION OF THE RELATED ART

Accessing web pages (of a website) over a network, such as an intranet or the Internet, is commonplace. Servers that operate as web servers or facilitate web-based services (e.g., instant messaging service) often provide web pages to clients (also referred to herein as "client computing devices") over a network connection. A user generally accesses web pages through a client computing device (e.g., a desktop computer or smart-phone) configured to retrieve web pages from the server and present the retrieved web pages to the user through a software application (referred to hereafter as a "user agent"). In addition to web browser, user agents may include e-mail clients capable of viewing HTML based e-mails or opening web pages, or instant messaging software.

Also commonplace are the client-side and server-side security issues associated with serving and accessing web pages. A server configuration, a client configuration, or code in a web page can render a server or a client computing device vulnerable to attack by malicious code from a nefarious party (also referred to herein as an "attacker"). The mean or path (also referred herein as a "vector") by which an attack on a computer device is carried out depends on the vulnerability.

Attacks based on a malicious script embedded into a web page (also referred to as a "script-based attack" or "scripting attack") are a prevalently form of attack vector. Cross-site scripting is one type of scripting attack, where an attacker injects a malicious client-side script into a web page adapted to bypass access controls and security mechanisms imposed by a use agent (e.g., web browser application) on the web pages accessed. Bypassing such security measures can allow an attacker to gain access to sensitive information maintained by the user agent (e.g., web browser application) on behalf of the user, including session cookies, saved passwords, and more. A variant of cross-site scripting, called document object model (DOM)-based cross-site scripting (DOMXSS), is known for malicious scripts that exploit document object model (DOM)-based vulnerabilities present in user agents (e.g., web browser applications and e-mail clients) to gain unauthorized access to client computing devices.

A document object model (DOM) is cross-platform (e.g., cross-browser) and language-independent convention for representing and interacting with objects and elements in Hypertext Markup Language (HTML), Extensible-Hypertext Markup Language (XHTML), and Extensible Markup Language (XML) documents. Objects and elements in a DOM may be addressed or manipulated using methods on the objects and elements; such methods are typically defined in (e.g., embedded in) the HTML, XHTML, or XML document of the DOM being addressed or manipulated. For example, web browser applications are known to use an internal DOM when rendering documents it accesses, such as HTML, XHTML, and XML documents. The DOM-based vulnerabilities present in user agents, such as web browser, usually result from the way in which a user agent processes web page content.

DOMXSS is typically implemented as a malicious, client-side JavaScript that is injected into a web page (e.g., at the web server) before the web page is accessed by a user. Upon execution, the DOMXSS JavaScript modifies the document object model (DOM) "environment" of a user's web browser application so that the state of a web page can be manipulated and/or a web page can be populate with dynamically-computed data according to the malicious intent of an attacker. Modifications to the DOM "environment" can cause ordinary client-side scripts and various web page elements to behave differently and unexpectedly, possibly to the user's detriment.

Unlike other cross-site scripting variants (e.g., reflective XSS and persistent XSS), DOMXSS primarily affects client-side script vulnerabilities and is usually carried out by use of properties accessible to the client (e.g., via a web browser at the client). DOMXSS can affect complex and user-driven event models of web pages, especially those associated with web applications such as Rich Internet Applications. Unfortunately, traditional systems for detecting web page-based vulnerabilities are unable to detect malicious changes to web page event models, especially where the malicious changes are perpetrated through a DOM-based vulnerability.

BRIEF SUMMARY OF VARIOUS EMBODIMENTS

Various embodiments provide systems and methods for scanning and detecting vulnerabilities of a web page (e.g., of a web site) by way of analyzing a document object model (DOM) associated with the web page and from the perspective of a client web browser.

According to some embodiments, a method for testing a vulnerability of a web site is provided, comprising: receiving a first set of addresses; identifying a second set of addresses by analyzing a first set of web pages located at the first set of addresses; and identifying a third set of addresses by analyzing a first set of document object models (DOMs) associated with the first set of web pages and associated with a second set of web pages located at the second set of addresses. The method may also comprise probing a third set of web pages for presence of a set of vulnerabilities using a document object model (DOM) analysis script to analyze a second set of document object models (DOMs) associated with the third set of web pages as a set of attack vectors is applied to the third set of web pages, where the third set of web pages is located at the first, second, and third sets of addresses, and the DOM analysis script is inserted into the third set of web pages. For some embodiments, an attack vector may be applied to a web page by remotely controlling a web browser application in accordance with the attack vector, or by transmitting to the web server or web service providing the web page a web page request (e.g., HTTP request) in accordance with the attack vector. The method may further comprise determining presence of the set of vulnerabilities for the third set of web pages based on a set of results from the probing, wherein the attack vectors are designed to exploit a vulnerability of a web page.

For some embodiments, determining the presence of the set of vulnerabilities based on the set of results may comprise matching a result in the set of results with a vulnerability result signature associated with a vulnerability in the set of vulnerabilities. Matching a result to a vulnerability result signature may be facilitated using a heuristic matching function. An exemplary vulnerability result signature may comprise an expected set of web page property changes (e.g., changes to a DOM element or property), web page content changes (e.g., overwrite of embedded JavaScript code), or web browser operations (e.g., access to session cookies unrelated to the web page) that are generally associated with one or more known vulnerabilities and which can be observed by embodiments (e.g., through analysis of a DOM).

To enable use of the inserted DOM analysis script during probing operations, the method may comprise inserting the DOM analysis script into each web page in the third set of web pages before the probing operation. Various embodiments may scan for and detect vulnerabilities relating to a Cross-Site Scripting (XSS), including document object model (DOM)-based Cross-Site Scripting (DOMXSS).

For some embodiments, the method may generate the first set of DOMs in association with the first and second sets of web pages by opening the first and second sets of web pages in a web browser context. Additionally, the method may generate the second set of DOMs in association with the third set of web pages by opening the third set of web pages in a web browser context.

For some embodiments, the DOM analysis script enables monitoring of read access or write access to a document object model (DOM) property, and the DOM property relates to a document object model (DOM) of a web page in which the DOM analysis script is inserted. The DOM analysis script may be inserted into the third set of web pages by way of proxy injection (e.g., through use of a web page proxy service or server). The DOM analysis script may be inserted into the third set of web pages by embedding code from the DOM analysis script into code of each web page in the third set of web pages. Depending on the embodiment, the DOM analysis script may be in JavaScript, JScript, or other ECMA Script language. The DOM analysis script may also be in Visual Basic (VB) Script.

The DOM analysis script may be written in a specific scripting language (e.g., JavaScript), and the DOM analysis script overwrites an operation native to the specific scripting language such that inspection of a function call, defined using the specific scripting language, is enabled. The DOM analysis script may further overwrite getter or setter methods of certain Hypertext Markup Language (HTML) element constructor prototypes (e.g., HTMLScript.prototype.src) or methods capable of creating new HTML elements (e.g., document.createElement( )).

The DOM analysis script may be configured to prevent a property change to a document object model (DOM) associated with a web page in which the DOM analysis script is inserted. For example, some embodiments may utilize features in the ECMA Script 5 standard (e.g., Object.defineProperty( )) to freeze properties, host objects, functions, and native properties related to a DOM of a web page. In doing so, some embodiments may prevent a malicious client-side script from overwriting or removing code relied upon by the DOM analysis script, or from disabling or bypassing analysis of a DOM by the DOM analysis script.

In various embodiments, the DOM analysis script may be configured to traverse some or all elements of a DOM that are associated with a web page comprising the DOM analysis script (e.g., by way of proxy insertion or injection). By traversing the elements, the DOM analysis script can expose DOM elements for scrutiny during DOM analysis, especially DOM elements that cannot be exposed.

According to some embodiments, a system for testing a vulnerability of a web site is provided, comprising: a crawler software module stored on a non-transitory computer readable medium, and a vulnerability scanner software module stored on a non-transitory computer readable medium. The crawler software module may be configured to: (a) receive a first set of addresses; (b) identify a second set of addresses by analyzing the first set of web pages located at the first set of addresses; and (c) identify a third set of addresses by analyzing a first set of document object models (DOMs) associated with the first set of web pages and a second set of web pages located at the second set of addresses.

For example, crawler software module may receive a set of universal resource locators (URLs) to a set of web pages or HTML forms, and crawl through those web pages to identify URL listed in those web pages as a second set of URLs. For the description provided herein, it will be understood that "web pages" may include, without limitation, both static and dynamically-generated HTML pages, and HTML pages implementing a HTML form.

Using the first and second sets of URLs, the crawler software module may then analyze the document object model (DOM) of each web page located at the first and second sets of URLs and identify a third set of URLs existing in the DOMs. Certain web pages have objects and elements that contain additional URLs, but are based on via a user-driven event model (e.g., pressing buttons, submitting forms, selecting web page elements controlled enabled by AJAX). Access to such objects and elements, and URLs contained therein, may be achieved through a DOM associated with the web page.

The vulnerability scanner software module may be configured to: (a) probe a third set of web pages for presence of a set of vulnerabilities using a document object model (DOM) analysis script to analyze a second set of document object models (DOMs) associated with the third set of web pages as a set of attack vectors is applied to the third set of web pages; and (b) determine presence of the set of vulnerabilities for the third set of web pages based on a result from the probing, where the third set of web pages is located at the first, second, and third sets of addresses, the DOM analysis script is inserted into the third set of web pages, and the attack vectors are designed to exploit a vulnerability of a web page. For some embodiments, an attack vector may be applied to a web page through the web browser software module, whereby the web browser may remotely control a web browser application in accordance with the attack vector. Additionally, or alternatively, an attack vector may be applied to a web page by transmitting to the web server or web service providing the web page a web page request (e.g., HTTP request) in accordance with the attack vector.

As noted herein, for some embodiments, determining the presence of the set of vulnerabilities based on the set of results may comprise matching a result in the set of results with a vulnerability result signature associated with a vulnerability in the set of vulnerabilities. The vulnerability result signature may be one of several vulnerability result signatures that may be stored in a vulnerability result signature data store that is included in the system. The vulnerability result signature data store may be populated with vulnerability result signatures discovered by organizations performing on-going browser security research (e.g., security notices posted by computer security companies), or vulnerability result signatures automatically discovered by the system based on other/similar vulnerability result signatures stored in the vulnerability result signature data store.

For example, using the set of URLs identified in a set of web pages and a set of DOMs associated with those web pages, the vulnerability scanner software module may probe a target set of web pages located at the set of identifies URLs for the presence of one or more vulnerabilities. The vulnerability scanner software module perform this by analyzing the DOMs of the target set of web pages as a set of attack vectors is applied against the target set of web pages. To determine the presence of a particular vulnerability, an attack vector (which may be pre-associated with the particular vulnerability) is applied against a target web page, and the result from the application is compared against a signature (e.g., pattern) associated with the particular vulnerability. If the behavior exhibited by the target web page, as a result of applying the attack vector, matches a behavior pattern associated with a particular vulnerability, then that particular vulnerability exists in the target web page.

For the purposes of detecting a vulnerability, exemplary attack vectors may include those designed to exploit a XSS vulnerability, a DOMXSS vulnerability, or some user-agent (e.g., web browser) supported attacks and vulnerabilities plaguing client. The attack vectors may be associated to a particular vulnerability and exploit, or may be associated with two or more vulnerability exploits. As noted herein, an attack vector may be applied to a web page by remotely controlling a web browser application in accordance with the attack vector, or by transmitting to the web server or web service providing the web page a web page request (e.g., HTTP request) in accordance with the attack vector.

In some embodiments, to enable use of the inserted DOM analysis script during probing operations, the system may further comprise a web page proxy software module stored on a non-transitory computer readable medium and configured to insert, by way of proxy injection (e.g., a proxy web service or a proxy web server), the DOM analysis script into each web page in the third set of web pages before the probing operation. To ensure that the DOM analysis script is performed before other elements of the web page are processed (e.g., malicious client-side script), the web page proxy software module may insert the DOM analysis script into the top most element of the web page before any other script code (e.g., beginning of the "<head>" element of a web page).

For some embodiments, the system may further comprise a web browser software module stored on a non-transitory computer readable medium and configured to: generate the first set of DOMs in association with the first and second sets of web pages by opening the first and second sets of web pages in a web browser context; or generate the second set of DOMs in association with the third set of web pages by opening the third set of web pages in a web browser context.

According to some embodiments, a system for testing a vulnerability of a web site is provided, comprising: a universal resource locator (URL) or HTML form crawler software module stored on a non-transitory computer readable medium; a document object model (DOM) crawler software module stored on a non-transitory computer readable medium; and a vulnerability scanner software module stored on a non-transitory computer readable medium.

The universal resource locator (URL) or HTML form crawler software module may be configured to: (a) traverse a first set of URLs or HTML forms (hereafter, also referred to as "forms") to a first set of web pages; and (b) identify a second set of universal resource locators (URLs)/forms from the first set of web pages. The document object model (DOM) crawler software module may be configured to: (a) traverse the first and second sets of URLs\forms to a second set of web pages in a web browser context such that a first set of document object models (DOMs) is generated in association with the second set of web pages; and (b) identify a third set of universal record locators (URLs)\forms based on the first set of document object models (DOMs). Depending on the embodiment, the document object model (DOM) crawler software module may be further configured such that the first set of DOMs is generated in association with the second set of web pages and in context of the DOM analysis script inserted into the second set of web pages.

The vulnerability scanner software module may be configured to: (a) traverse the first, second, and third sets of URLs or forms to a third set of web pages in the web browser context such that a second set of document object models (DOMs) is generated in association with the third set of web pages and in context of a document object model (DOM) analysis script inserted into the third set of web pages; (b) probe the third set of web pages for presence of a set of vulnerabilities by using the DOM analysis script to analyze the second set of DOMs as a set of attack vectors is applied to the third set of web pages; and (c) determine presence of the set of vulnerabilities for the third set of web pages based on a result from the probing, wherein the attack vectors are designed to exploit a vulnerability of a web page.

To facilitate the opening of web pages in a web browser context, the system may further comprise a web browser software module stored on a non-transitory computer readable medium and configured to traverse a universal resource locator (URL) to a target web page using a web browser application, and provide a traversal result from the web browser application, where the traversal result includes a document object module (DOM) generated for the target web page. Accordingly, for some embodiments, the document object model (DOM) crawler software module may use the web browser software module to traverse the first and second sets of URLs and forms to the second set of web pages in the web browser context. Likewise, the vulnerability scanner software module may use the web browser software module to traverse the first, second, and third sets of URLs and forms to the third set of web pages in the web browser context. Depending on the embodiment, the web browser software module may use the web browser application by issuing a command to the web browser application and receiving a result of the command from the web browser application. The web browser software module may comprise, or interface with, a web browser driver configured to communicate with one or more web browser applications, which may differ in type or version (e.g., Microsoft® Internet Explorer® 9, and Mozilla® Firefox® 12). By using a web browser driver, the web browser software module may remotely control the web browser application for the purposes of vulnerability testing. Because different web browser applications vary in what features, plug-ins, extensions, and scripting standards they support, and how they render an internal DOM for web pages, using the web browser driver (as opposed to using just one web browser type/version) enables certain embodiments to test a web page against multiple attack vectors and across multiple web browser types/versions, thereby achieving excellent accuracy and breadth of coverage during vulnerability scanning.

For some embodiments, the system may further comprise a web proxy software module stored on a non-transitory computer readable medium and configured to insert the DOM analysis script into a requested web page as the requested web page is provided through the web context, wherein the web page proxy software module is used to insert the DOM analysis script into the second set of web pages or the third set of web pages.

For certain embodiments, the system may further comprise a user interface software module stored on non-transitory computer-readable storage medium and configured to present a user interface, through which a user (e.g., "testing supervisor" or "test administrator") may control the system (e.g., request a vulnerability scan job), adjust settings for the system (e.g., adjust settings of a scan job), or review results from the system (e.g., review results of a scan job, or request a scan report).

According to some embodiments, various operations described above are implemented using a computer system, possibly by way of a computer program product comprising a computer usable medium having computer program code embodied therein for vulnerability testing of a web site.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

One or more embodiments are described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE VARIOUS EMBODIMENTS

Various embodiments are presented herein relate to scanning for and detecting web page vulnerabilities, including cross-site scripting (XSS). Some embodiments are configured to scan for and detect vulnerabilities of a target web page using a client-based approach, which may employ a remotely-controlled web browser application (or a web browser engine) capable of generating a document object model (DOM) for the target web page as the web page is accessed (e.g., from a web site) by the web browser application (or web browser engine). Some embodiments may scan for and detect web page vulnerabilities by actively monitoring the DOM (e.g., DOM properties or DOM elements) associated with a targeted web page, as one or more attack vectors are applied to the target web page. Monitoring the DOM of a target web page may permit various embodiments to detect vulnerabilities in the target web page by observing effects on the target web page as a result of applying an attack vector (known or recently discovered) on the target web page. The observed results/effects may indicate the presence of one or more vulnerabilities in the target web page. With this approach, certain embodiments can detect vulnerabilities in a target web page independent of the presence of an event model, the complexity of an event model, or obfuscation of the malicious code (e.g., XSS code).

Target web pages may be associated with a web site or a web-based service accessible over a network by user agent (e.g., web browser). Target web pages may include those associated with an application coded in a web browser-supported language (e.g., JavaScript and XML, as used in Asynchronous JavaScript and XML), such a Rich Internet Application (RIA). Applications coded in a web browser-supported language, hereafter referred to as "web applications," may include those web applications operating as stand-alone computer applications (e.g., without the need for a network and a separate server). Web applications often have a complex user-interaction-driven event model and utilize sophisticated user agent-supported features (e.g., frames, data presentation, and scripting features). Target web pages may also include those accessed or utilized by non-browser user agents, such as e-mail clients and instant messaging applications.

Figure 1:
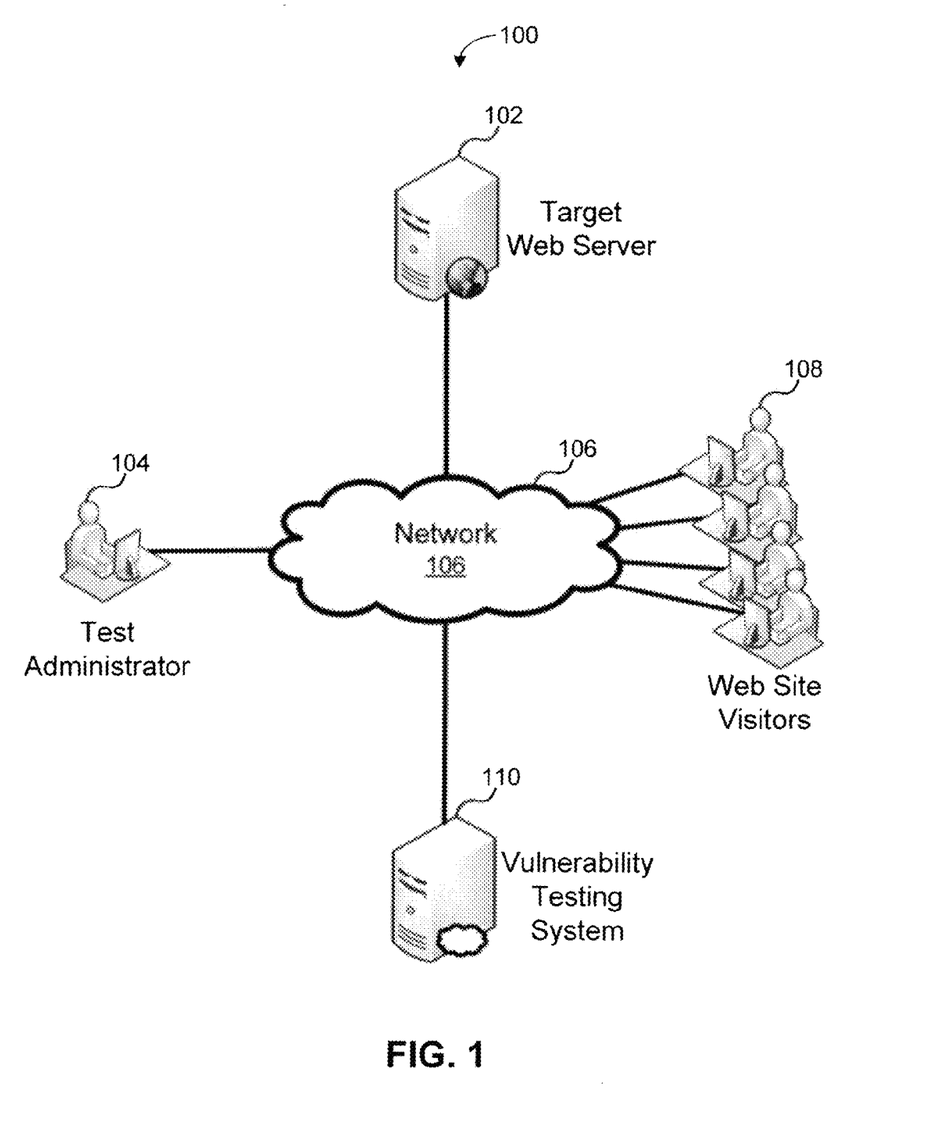
FIG. 1 is a diagram illustrating an exemplary network environment that includes a vulnerability testing system in accordance with some embodiments.

Before describing various embodiments in detail, it is useful to describe an exemplary environment in which various embodiments may be utilized. FIG. 1 presents such an exemplary environment and illustrates an exemplary network environment 100 including a vulnerability testing system 110 in accordance with some embodiments. Depending on the embodiment, the vulnerability testing system 110 may be implemented using one or more computing devices (e.g., a server or a cluster of servers), may be implemented using cloud services (e.g., scalable on-demand cloud computing resources). For some embodiments, the vulnerability testing system 100 may be implemented as a System-as-a-Service (SaaS). As a SaaS, the vulnerability testing system 100 may be made available (e.g., to independent web site administrators, or independent consultants) as a subscription-based or pay-as-you-go tool, utilizable for vulnerability analysis of specific web sites.

The network environment 100 includes a target web server 102 configured to host one or more web sites and provide access to those web sites to one or more web site visitors 108. The web site visitors 108 may include users at individual client computing devices, such as desktops, laptops, tablets, and smart phones. In some embodiments, web site visitors 108 may include computer programs configured to access web sites in a predefined manner (e.g., web crawler typically used by search engines). The web site visitors 108 generally access web sites hosted by the target web server 102 over a computer network 106, which facilitates communication between the web site visitors 108 and the server 102. The computer network 106 also facilitates communication between the target web server 102 and the vulnerability testing system 110, thereby permitting the vulnerability testing system 110 to access web pages hosted on the target web server 102 and detect the presence of exploitable vulnerabilities (e.g., persistent XSS, reflective XSS, or DOMXSS). Depending on the environment and embodiment, the network 106 may comprise a public network (e.g., the Internet) or private network (e.g., intranet).

The vulnerability testing system 110 may operate in accordance with instructions provided by a test administrator 104 through a client computing device. The test administrator 104 may configure, instruct, and control the vulnerability test system 110 through a control interface (e.g., command line interface or graphical user interface), provided by the vulnerability test system 110. For instance, the vulnerability test system 110 may provide the test administrator 104 with a web-based user control interface adapted to receive configuration changes or instructions by way of graphical user interaction. In some embodiments, the control interface may include a system-level/software component-level interface (e.g., web services interface, such as SOAP or XML-RPC) operable in receiving configuration changes or instructions from other systems and programs. Such system-level/software component level interfaces may permit the vulnerability testing system 110 to collaboratively operate with other tools and services (e.g., other web site security analysis tools). Access to the control interface may be controlled according to user authenticated or through a role-based approach (e.g., read-only access to clients, and full-access to administrators).

Through the control interface, various embodiments (e.g., vulnerability testing system 110) may be instructed or configured to perform the scan jobs scan on one or more web sites (e.g., hosted by the target web server 102) for web-site vulnerabilities. In one example, the vulnerability testing system 110 may handle vulnerability scan requests as scan jobs, where each scan job may involve a set of web sites (and their associated web pages) or a set of specific web pages associated with one or more web sites. For each scan job, the web sites or web pages may be specified by a location address, such as a universal resource locator (URL). The control interface may enable the test administrator 104 (or some external system or program) to instruct or configure the vulnerability testing system 110 to perform one or more scan jobs, performed concurrently or sequentially.

In addition to providing status on individual scan jobs (e.g., running, paused, completed), the control interface may provide the test administrator 104 (or an external system) access to the results from various scan jobs, possibly at or near-real time. The results from scan jobs may provide, for example: a listing of vulnerabilities detected in the targeted web pages or web sites; a listing of issues that arose during a scan job (e.g., network connection failure); analytical information regarding a scan job (e.g., process usage, process speed, detection confidence score); performance details regarding a scan job (e.g., start time, completion time, run time; or general summary for a scan job (e.g., high, medium, or low security risk assessed).

In addition to analyzing web servers, and web sites hosted thereon, those skilled in the art will readily appreciate that various embodiments may be additionally or alternatively configured to analyze other web-based services that provide document object model (DOM)-supported content and potentially contain malicious scripting designed to exploit a computer security vulnerability (such as web page content opened through an e-mail client, or a word processing application).

Figure 2:
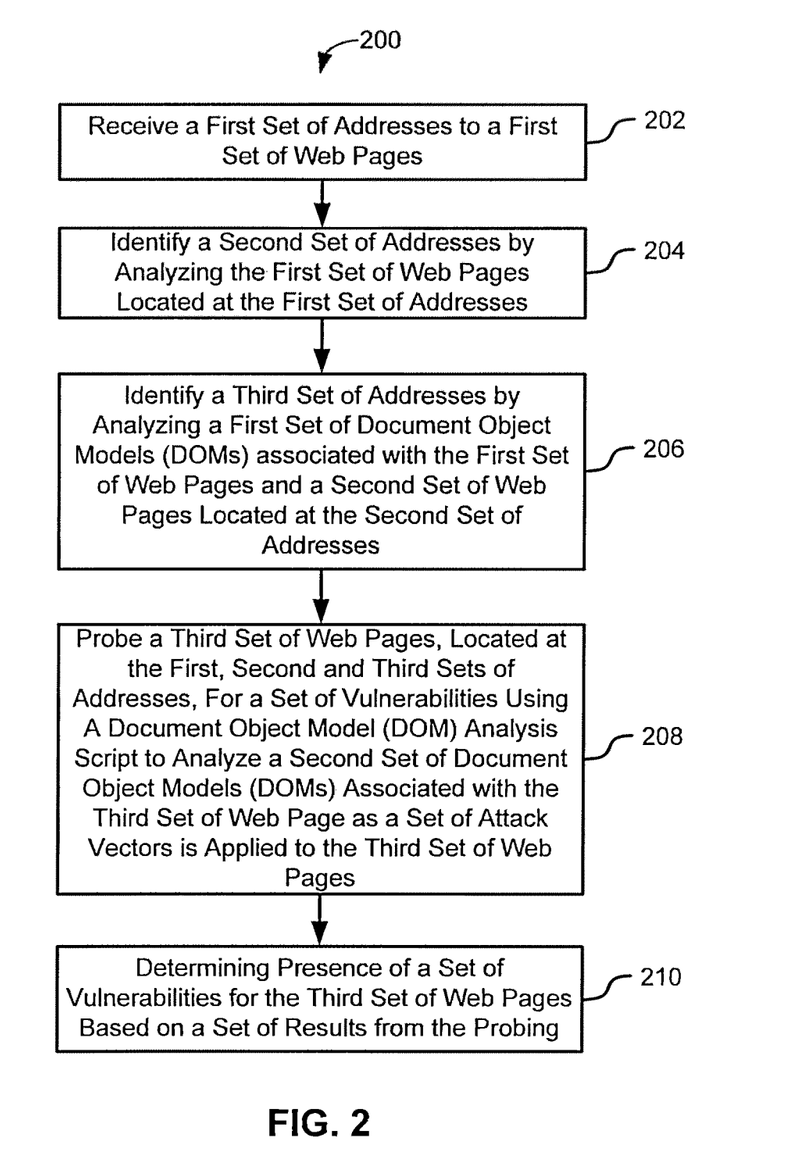
FIG. 2 is a flowchart illustrating an exemplary method for testing a web site for vulnerabilities in accordance with some embodiments.

FIG. 2 is a flowchart illustrating an exemplary method 200 for testing a web site for vulnerabilities in accordance with some embodiments. For certain embodiments, the method 200 may be performed by a system similar to the vulnerability testing system of 110 of FIG. 1.

At operation 202, a first set of addresses to a first set of web pages is received (e.g., the vulnerability testing system 110). The first set of web pages may be a set of web pages targeted by an embodiment for vulnerability scanning and may be associated with one or more web sites. The first set of addresses may comprise universal resource locators (URLs) forms to the first set of web pages, and may be received through an interface (e.g., command line interface—CLI, or a graphical user interface—GUI) configured to control an embodiment. For example, in FIG. 1, the test administrator 104 may submit a set of URLs\forms to one or more target web pages to the vulnerability testing system 110.

At operation 204, a second set of addresses are identified by analyzing the first set of web pages located at the first set of addresses. For some embodiments, the second set of addresses identified may be a set of URLs\forms to a second set of web pages. Additionally, the second set of web pages may or may not be associated to the same web sites (e.g., same domain name) as the first set of web pages. To identify the second set of addresses, analysis of the first set of web pages may entail "crawling"/browsing through the first set of web pages to identify links (e.g., HTML hyperlinks including a URL address) contained in the first set of web pages and, possibly, identify links contained in web pages linked to the first set of web pages (e.g., linked via a hyperlink). The "crawling"/browsing may be performed by traversing the first set of addresses to the first set of web pages, identifying links in the first set of web pages, traversing the identified links (from the first set of web pages) to another set of web pages, and repeating the link identification process for the other set of web pages. The second set of addresses may comprise the set of links collectively identified by the "crawling" process when the "crawling" process reaches its end (e.g., "crawling" process when the process reaches a predefined traversal depth, or when all web pages for a given web site have been covered by the crawler). For certain embodiments, identifying the second set of addresses may be facilitated using a web crawler (also referred to as "web spiders" or "bots") configured to automatically browse a web site or a web page in a predetermined manner.

At operation 206, a third set of addresses is identified by analyzing a first set of document object models (DOMs) associated with the first set of web pages (located at the first set of addresses) and a second set of web pages located at the second set of addresses. As noted herein, a document object model (DOM) is cross-platform (e.g., cross-browser) and language-independent convention for representing and interacting with objects and elements in Hyptertext Markup Language (HTML), Extensible-Hypertext Markup Language (XHTML), and Extensible Markup Language (XML) documents. Generally, when a web browser is to present a web page (e.g., written in HTML or XHTML) to a user, the web browser generates a DOM in association with the web page as the web page rendered for presentation. By doing so, the web browser can support methods defined in web pages (e.g., in the HTML or XHTML) that manipulate and address objects and elements in the DOM. In order to operate as expected, web applications, such as Rich Internet Applications (RIA), often rely on web browser applications to support such methods.

Analysis of the first set of DOMs, to identify the third set of addresses, may comprise traversing objects and elements of each DOM in the first set of DOMs, including those objects and elements associated with web page event models (e.g., forms, click buttons, frames, scripts), and following those objects and elements to additional URLs. For some embodiments, a document object model (DOM) analysis script may be inserted into the first and second sets of web pages to provide further visibility into objects and elements of the first set of DOMs for purposes of identifying additional URLs (associated with the first set of DOMs). Additionally, in order to follow objects and elements of a DOM, some embodiments may traverse each element of a tree (a "DOM tree") associated with a DOM.

Appendix A, included herein, provides a listing of pseudo-code for an exemplary JavaScript, "DOM crawler", configured crawl through a web page and find URLs from the web page that a non-DOM crawler (e.g., HTTP crawler) would fail to identify. Those skilled in the art will appreciate that in various embodiments the code shown for "DOM crawler" may be composed in other scripting languages, such as JScript or Visual Basic script, which may be inserted into the code of a web page and then executed in a web browser context when the web page is rendered.

By following URLs associated with objects and elements of a DOM, various embodiments can identify and gather URLs from a web page that a non-DOM crawler would generally miss. For some embodiments, the third set of addresses identified may be a set of URLs, and may have partial or complete overlap with the first or second set of addresses.

At operation 208, a third set of web pages located at the first, second, and third sets of addresses are probed by analyzing a second set of document object models (DOMs), associated with the third set of web pages, using a document object model (DOM) analysis script. For some embodiments, to enable use of the DOM analysis script with the second set of DOMs, the DOM analysis script may be inserted into the third set of web pages associated with the second set of DOMs. The DOM analysis script may be inserted into the third set of web pages by embedding code from the DOM analysis script into the code of each web page in the third set of web pages. Depending on the embodiment, the DOM analysis script may be written in JavaScript, JScript, or some other ECMA Script. The DOM analysis script may also be written in Visual Basic (VB) Script. The DOM analysis script may be inserted into the third set of web pages by way of proxy injection (e.g., through use of a web page proxy service or server).

For particular embodiments, the DOM analysis script may be utilized to monitor the second set of DOMs as a set of attack vectors are applied to the third set of web pages. For example, the DOM analysis script may monitor read access or write access to a document object model (DOM) property as attack vectors are applied.

Appendix A, included herein, provides a listing of pseudo-code for an exemplary JavaScript, "DOM scanner", configured to scan for the existence of DOM-based vulnerabilities and exploits (e.g., bugs) in a web page as the web page is rendered (e.g., loaded) with an DOM-based attack vector already inserted (e.g., injected) into the web page's code (sometimes referred to as a web page having a pre-poisoned DOM). Appendix A also provides a listing of pseudo-code for an exemplary JavaScript, "DOM injector", configured to insert (e.g., inject) a DOM-based attack vector into the code of a web page (e.g., for eventual vulnerability scanning by the "DOM scanner"). Those skilled in the art will appreciate that in various embodiments the code shown for "DOM scanner" or "DOM injector" may be composed in other scripting languages, such as JScript or Visual Basic script, which may be inserted into the code of a web page and then executed in a web browser context when the web page is rendered.

By providing increased visibility of DOM objects and elements, the DOM analysis script may permit certain embodiments to observe behavior of the third set of web pages as attack vectors are applied to the third set of pages. Depending on the embodiment, an attack vector may be applied to a web page by remotely controlling a web browser application in accordance with the attack vector, or by transmitting to the web server or web service providing the web page a web page request (e.g., HTTP request) in accordance with the attack vector.

In various embodiments, the DOM analysis script may be configured to traverse some or all elements of a DOM associated with a web page containing the DOM analysis script (e.g., by way of proxy insertion or injection). By traversing the elements, the DOM analysis script can expose DOM elements for scrutiny during DOM analysis, especially DOM elements that cannot be exposed.

Various embodiments may implement the DOM analysis script by way of a prototypic library based on ECMA Script 5 object extensions. The prototypic library may facilitate inline code analysis of scripts, in a web page, directly in the context of the web page's DOM. The prototypic library may wrap native script methods (e.g., JavaScript methods) such that behavior of the methods may be dynamically analyzed. For example, the DOM analysis script may overwrite an operation native to a specific scripting language (e.g., JavaScript) such that inspection of a function call, defined using the specific scripting language, is enabled. The DOM analysis script may also overwrite getter or setter methods of certain Hypertext Markup Language (HTML) element constructor prototypes (e.g., HTMLScript.prototype.src, or HTML element prototype innerHTML and outerHTML properties) or methods capable of creating new HTML elements (e.g., document.createElement( )). Overwriting the methods capable of creating new HTML elements may prevent various malicious scripts from creating new DOM elements, applying attributes to the DOM elements, and attaching the DOM elements to a DOM to execute malicious payload.

The DOM analysis script may prevent a property change to a document object model (DOM) associated with a web page in which the DOM analysis script is inserted. For example, various embodiments may leverage features in the ECMA Script 5 standard (e.g., Object.defineProperty( )) to freeze properties, host objects, functions, and native properties related to a DOM of a web page. In this way, some embodiments may prevent a malicious client-side script from overwriting or removing code relied upon by the DOM analysis script, or from disabling or bypassing analysis of a DOM by the DOM analysis script.

The attack vectors utilized on the third set of web pages may include attack vectors known to exploit certain vulnerabilities and recently discovered attack vectors (e.g., discovered by independent research). For example, the applied attack vectors may be associated with XSS vulnerabilities and, more particularly, DOMXSS.

At operation 210, the presence of a set of vulnerabilities is determined for the third set of web pages based on the set of results from the probing. Determining the presence of the set of vulnerabilities based on the set of results may comprise matching a result in the set of results with a vulnerability result signature associated with a vulnerability in the set of vulnerabilities. Matching a result to a vulnerability result signature may be facilitated by way of a heuristic matching function. An exemplary vulnerability result signature may comprise an expected set of property changes (e.g., changes to a DOM element or property), web page content changes (e.g., overwrite of embedded JavaScript code), or web browser operations (e.g., access to session cookies unrelated to the web page) that are generally associated with one or more known vulnerabilities and which can be observed by embodiments (e.g., through analysis of a DOM). The vulnerability result signatures may be associated with Cross-Site Scripting (XSS), including document object model (DOM)-based Cross-Site Scripting (DOMXSS).

Figure 3:
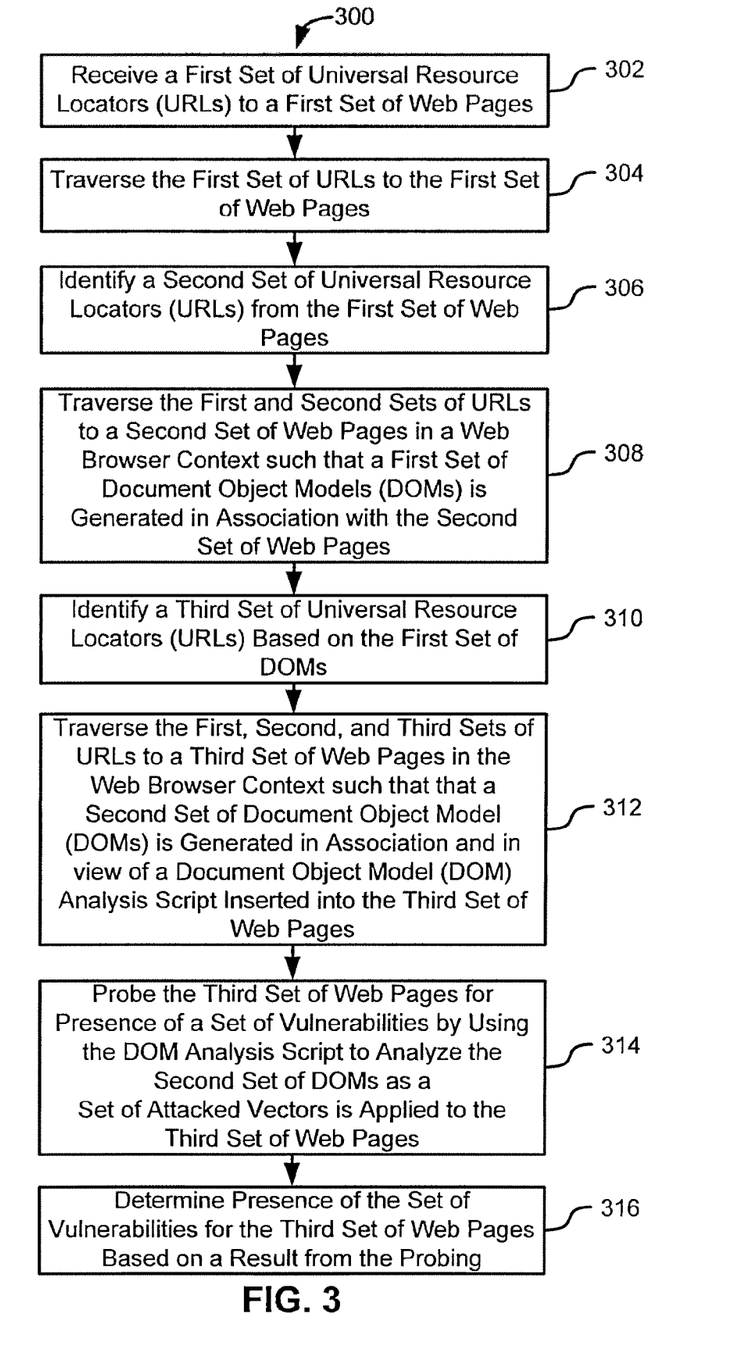
FIG. 3 is a flowchart illustrating an exemplary method for testing a web site for vulnerabilities in accordance with some embodiments.

FIG. 3 is a flowchart illustrating an exemplary method 300 for testing a web site for vulnerabilities in accordance with some embodiments. For particular embodiments, the method 300 may be performed by a system similar to the vulnerability testing system of 110 of FIG. 1. The method 300 may be configured to employ a web browser context in generating a DOM in association web pages targeted for vulnerability scanning and detection.

At operation 302, a first set of universal resource locators (URLs) are received (e.g., by the vulnerability testing system 110) for a first set of web pages. The first set of URLs may be received through an interface (e.g., command line interface—CLI, or a graphical user interface—GUI) configured to control an embodiment. For example, in FIG. 1, the vulnerability testing system 110 may receive from the test administrator 104 a set of URLs to one or more target web pages.

At operation 304, the first set of URLs to the first set of web pages are traversed, and at operation 306, a second set of universal resources locators (URLs) are identified from the first set of web pages. For various embodiments, the second set of URLs\forms, to a second set of web pages, may or may not be associated to the same web sites (e.g., same domain name) as the first set of web pages. To identify the second set of URLs\forms, analysis of the first set of web pages may comprise traversing the first set of URLs\forms to the first set of web pages, and then "crawling"/browsing through the first set of web pages to identify links/forms (e.g., HTML hyperlinks including a URL address) contained in the first set of web pages and, possibly, identify links contained in web pages linked to the first set of web pages (e.g., linked via a hyperlink). The "crawling"/browsing may be performed by identifying links/forms in the first set of web pages, traversing the identified links (from the first set of web pages) to another set of web pages, and repeating the link/form identification process for the other set of web pages. The second set of URLs\forms may comprise the set of links collectively identified by the "crawling" process when the "crawling" process reaches its end. For certain embodiments, identifying the second set of URLs\forms may be facilitated using a web crawler configured to automatically browse a web site or a web page in a predetermined manner.

At operation 308, the first and second sets of URLs\forms to a second set of web pages are traversed in a web browser context such that a first set of document object models (DOMs) is generated in association with the second set of web pages. Additionally, at operation 310, a third set of universal resource locators (URLs) forms are identified based on the first set of DOMs. To identify the third set of URLs\forms, analysis of the first set of DOMs may comprise traversing objects and elements of each DOM in the first set of DOMs, including those objects and elements associated with web page event models (e.g., forms, click buttons, frames, scripts), and following those objects and elements to additional URLs.

For some embodiments, the first set of DOMs may be generated, in a web browser context, in association with the second set of web pages by opening the first and second sets of URLs\forms in a remotely-controlled web browser application. The web browser may be capable of generating a document object model (DOM) for the target web page as it is accessed by the web browser. Depending on the embodiment, the method 300 may utilize a web browser driver configured to communicate with one or more web browser applications, which may differ in type or version (e.g., Microsoft® Internet Explorer® 9, and Mozilla® Firefox® 12). Use of a web browser driver may facilitate remote control of a web browser application for the purposes of vulnerability testing. Because different web browser applications vary in what features, plug-ins, extensions, and scripting standards they support, and how they render an internal DOM for web pages, using the web browser driver (as opposed to using just one web browser type/version) enables certain embodiments to test a web page against multiple attack vectors and across multiple web browser types/versions, thereby achieving excellent accuracy and breadth of coverage during vulnerability scanning.

In some embodiments, a document object model (DOM) analysis script may be inserted into the first and second sets of web pages to provide further visibility into objects and elements of the first set of DOMs for purposes of identifying additional URLs\forms/etc (associated with the first set of DOMs). By following URLs\forms/etc associated with objects and elements of a DOM, various embodiments can identify and gather URLs\forms/etc from a web page that a non-DOM crawler would generally miss. For some embodiments, the third set of URLs may have partial or complete overlap with the first or second set of URLs.

At operation 312, the first, second, third sets of URLs to a third set of web pages are traversed in a web browser context such that a second set of document object models (DOMs) is generated in association with the third set of web pages, and in view of a document object model (DOM) analysis script inserted into the third set of web pages.

For some embodiments, generating the second set of DOMs in a web browser context in association with the third set of web pages and in view of a document object model (DOM) analysis script may comprise: (1) opening the first second, and third sets of URLs\forms/etc, in a remotely-controlled web browser application, to the third set of web pages; and (b) inserting the DOM analysis script into the third set of web pages before the web page reach the remotely-controlled web browser application. Various embodiments may insert the DOM analysis script by way of proxy injection using, for instance, a web proxy software module As noted herein, the web browser may be capable of generating a document object model (DOM) for the target web page as it is accessed by the web browser. Depending on the embodiment, the method 300 may utilize a web browser driver configured to communicate with one or more web browser applications, and facilitate remote control of a web browser application for the purposes of vulnerability testing. Use of the web browser driver to remotely-control different web browser applications for vulnerability scanning allows particular embodiments to test a web page, and its associated DOM, against multiple attack vectors and across multiple web browser types/versions. Because a given version of web browser application may render an internal DOM different from other versions of web browser applications, a variety of DOMs may be generated for each web page in the third set of web pages when multiple web browser types/versions are utilized to generate the second set of DOMs from the third set of web pages. Subsequently, the generated variety of DOMs can be monitored for the web page as attack vectors are applied to the web page, and the variety of DOMs can provide better likelihood of detecting a vulnerability that exists for a the web page, especially when the vulnerability is associated with a particular type/version of web browser application.

At operation 314, a third set of web pages located (at the first, second, and third sets of addresses) are probed by analyzing the second set of document object models (DOMs), associated with the third set of web pages, using a document object model (DOM) analysis script. As noted herein, use of the DOM analysis script with the second set of DOMs may be facilitated by inserting the DOM analysis script into the third set of web pages, which is associated with the second set of DOMs. Additionally, the DOM analysis script may be inserted into the third set of web pages by embedding code from the DOM analysis script into the code of each web page in the third set of web pages.

The DOM analysis script may be written in JavaScript, JScript, or Visual Basic (VB) Script. The DOM analysis script may be inserted into the third set of web pages by way of proxy injection (e.g., through use of a web page proxy service or server).

The DOM analysis script may be utilized to monitor the second set of DOMs as a set of attack vectors are applied to the third set of web pages. In some examples, the DOM analysis script may monitor read access or write access to a document object model (DOM) property or element as attack vectors are applied. By providing increased visibility of DOM objects and elements, the DOM analysis script may enable particular embodiments to observe behavior of the third set of web pages as attack vectors are applied to the third set of pages.

In some embodiments, the DOM analysis script may be configured to traverse some or all elements of a DOM associated with a web page comprising the DOM analysis script (e.g., by way of proxy insertion or injection). Traversal of elements by the DOM analysis script can expose DOM elements for scrutiny during DOM analysis, particularly DOM elements that cannot be exposed.

Some embodiments may incorporate the DOM analysis script by way of a prototypic library based on ECMA Script 5 object extensions, where the prototypic library may facilitate inline code analysis of scripts, in a web page, directly in the context of the web page's DOM. The prototypic library may wrap native script methods (e.g., JavaScript methods) such that behavior of the methods may be dynamically analyzed. For example, the DOM analysis script may overwrite an operation native to a specific scripting language (e.g., JavaScript) such that inspection of a function call, defined using the specific scripting language, is enabled. The DOM analysis script may further overwrite methods of certain Hypertext Markup Language (HTML) element constructor prototypes (e.g., HTMLScript.prototype.src, or HTML element prototype innerHTML and outerHTML properties) or methods capable of creating new HTML elements (e.g., document.createElement( )). Overwriting HTML element creation methods can prevent various malicious scripts from creating new DOM elements, applying attributes to the DOM elements, and attaching the DOM elements to a DOM to execute malicious payload.

The DOM analysis script may be configured to prevent property changes to a document object model (DOM) associated with a web page in which the DOM analysis script is inserted. For instance, various embodiments may leverage features in the ECMA Script 5 standard (e.g., Object.defineProperty( )) to freeze properties, host objects, functions, and native properties related to a DOM of a web page. In this way, some embodiments may prevent a malicious client-side script from overwriting or removing code relied upon by the DOM analysis script, or from disabling or bypassing analysis of a DOM by the DOM analysis script.

The attack vectors utilized on the third set of web pages may include attack vectors known to exploit certain vulnerabilities and recently discovered attack vectors (e.g., discovered by independent research). For example, the applied attack vectors may be associated with XSS vulnerabilities and, more particularly, DOMXSS.

At operation 316, the presence of a set of vulnerabilities is determined for the third set of web pages based on the set of results from the probing. Determining the presence of the set of vulnerabilities based on the set of results may comprise matching a result in the set of results with a vulnerability result signature associated with a vulnerability in the set of vulnerabilities. Matching a result to a vulnerability result signature may be facilitated by way of a heuristic matching function. An exemplary vulnerability result signature may comprise an expected set of property changes (e.g., changes to a DOM element or property), web page content changes (e.g., overwrite of embedded JavaScript code), or web browser operations (e.g., access to session cookies unrelated to the web page) that are generally associated with one or more known vulnerabilities and which can be observed by embodiments (e.g., through analysis of a DOM). The vulnerability result signatures may be associated with Cross-Site Scripting (XSS), including document object model (DOM)-based Cross-Site Scripting (DOMXSS).

Figure 4:
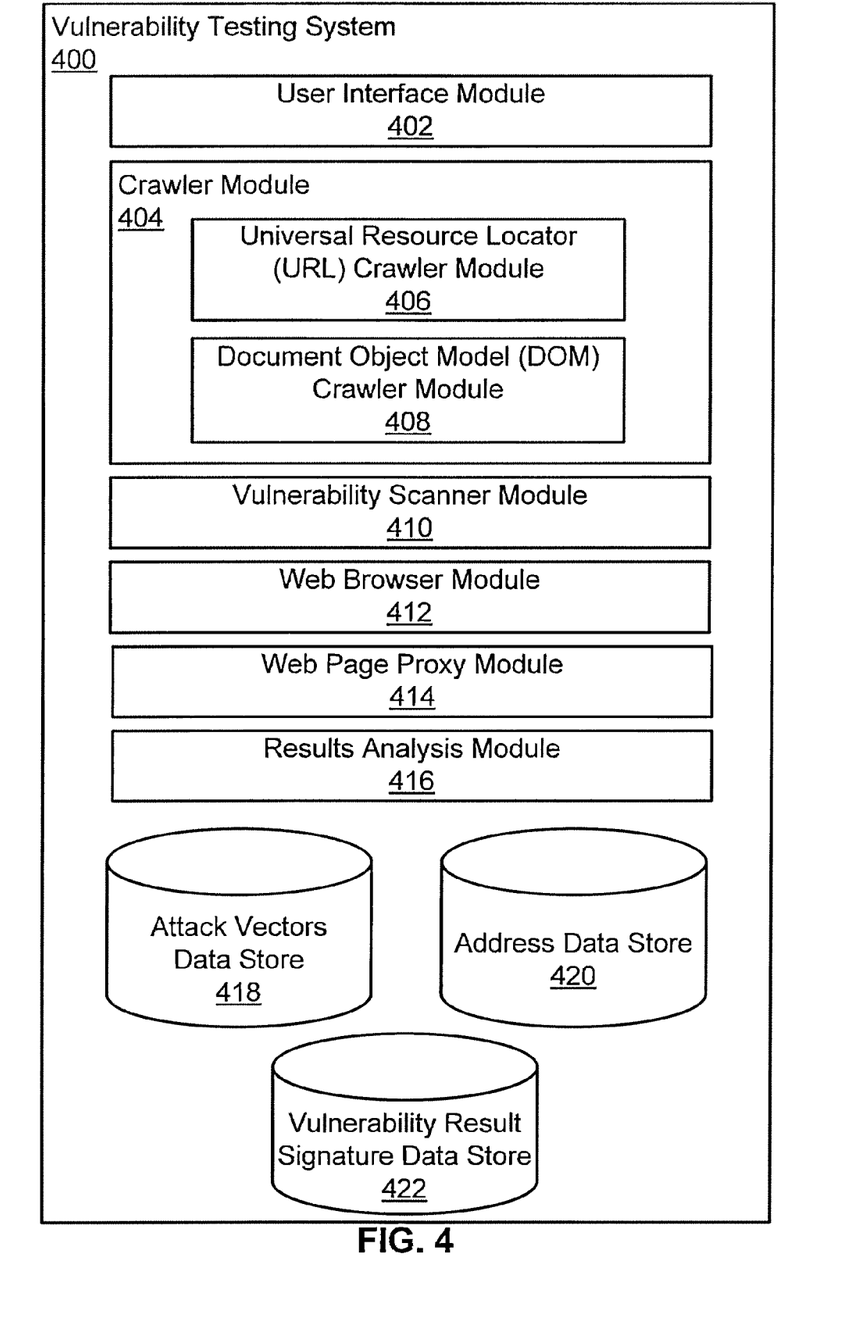
FIG. 4 is a block diagram illustrating an exemplary vulnerability testing system in accordance with some embodiments.

FIG. 4 is a block diagram illustrating an exemplary vulnerability testing system 400 in accordance with some embodiments. The vulnerability testing system 400 comprises a user interface module 402, a crawler module 404, a vulnerability scanner module 410, a web browser module 412, a web page proxy module 414, and a results analysis module 416. The vulnerability testing system 400 may further comprises an attack vectors data store 418 for storing attack vectors used in vulnerability testing, an address data store (e.g., for universal resource locators (URLs) to web pages and HTML forms), and a vulnerability result signature data store 422.

Through the user interface module 402, the vulnerability testing system 400 may receive from a test administrator configuration changes or instructions for the vulnerability testing system 400. The user interface module 402 may, for example, a test administrator with a command line interface (CLI) (e.g., through a terminal connection to the vulnerability testing system 400) or a graphical user interface (GUI) (e.g., through a web-based user control interface provided by the vulnerability testing system 400 over a network connection). By way of the user interface control module 402, a test administrator can submit to the vulnerability testing system 400 one or more addresses (e.g., URLs) to specific web pages or to entire web sites to be tested for web page vulnerabilities. Addresses received through the user interface module 402 may be stored on the address data store 420 and, subsequently, supplied (by the address data store 420) to other modules of the vulnerability testing system 400, including the crawler module 404.

In addition to, or in place of, the user interface module 402, the vulnerability testing system 400 may include a system-level/component-level interface (e.g., web services interface, such as SOAP or XML-RPC) operable in receiving configuration changes or instructions from other systems and programs. Such a system-level/component-level interface may permit the vulnerability testing system 110 to collaboratively operate with other tools and services (e.g., other web site security analysis tools). Access to the user interface module 402 or system-level/component-level interface may be controlled according to user authentication or through a role-based approach (e.g., read-only access to clients, and full-access to administrators).

The crawler module 404 may be responsible for "crawling"/browsing web pages or web sites (specified through the user interface module 402 or a system-level interface) for the purposes of gathering addresses (e.g., URLs to web pages and HTML forms) from the specified web pages or web sites. The "crawling"/browsing process may entail identifying addresses embedded in the code of the specified web pages or web sites and, additionally, may entail analyzing document object model (DOMs) (e.g., crawling through DOM objects or DOM elements) associated with the specified web pages or web sites to identify addresses. It should be noted that addresses identified during the "crawling"/browsing process might overlap with those addresses originally specified through user interface module 402. Addresses identified by the crawler module 404 may be stored on the address data store 420 and, subsequently, supplied (by the address data store 420) to other modules of the vulnerability testing system 400, including the vulnerability scanner module 410 and the web browser module 412. When adding addresses to the address data store 420, the vulnerability testing system 400 may be configured to avoid adding duplicate addresses to the address data store 420.

For particular embodiments, the crawler module 404 may comprise a universal resource locator (URL) crawler module 406, configured to identify URLs and forms in the web page code, and a document object model (DOM) crawler module 408, configured to identify URLs\forms by analyzing DOMs associated with web pages. Some embodiments may utilize a "classical" web crawler application or process in the URL crawler module 406. Additionally, in order to analyze DOMs associated with the web pages or web sites specified through the user interface module 402, the DOM crawler module 408 may employ the web browser module 412 to open web pages in a web browser context and, in the process, generate DOMs for the web pages opened.

The vulnerability scanner module 410 may be configured to probe a third set of web pages for presence of a set of vulnerabilities using a document object model (DOM) analysis script to analyze document object models (DOMs) associated with a set of web pages as a set of attack vectors is applied to the third set of web pages. As noted herein, the attack vectors may be designed to exploit a (known or recently discovered) web page vulnerability. Additionally, attack vector may be applied to a web page through the web browser module 412, whereby the web browser module 412 may remotely control a web browser application in accordance with the attack vector. Additionally, or alternatively, an attack vector may be applied to a web page by transmitting to the web server or web service providing the web page a web page request (e.g., HTTP request) in accordance with the attack vector. The set of attack vectors utilized by the vulnerability testing system 400 may be stored on and supplied by an attack vector data store 418.

The vulnerability scanner module 410 may be further configured to determine presence of the set of vulnerabilities for the set of web pages based on a result from the probing. Utilizing the DOM analysis script may comprise inserting the DOM analysis script into the set of web pages to be analyzed. The script insertion may be achieved through the web page proxy module 414, which may inject the DOM analysis script into the set of web pages by way of proxy. Determining the presence of the set of vulnerabilities, based on a result, may comprise the vulnerability scanner module 410 matching a result in the set of results with a vulnerability result signature associated with a vulnerability in the set of vulnerabilities.

For some embodiments, such a vulnerability result signature may be stored and provided by a vulnerability result signature data store 422. The vulnerability result signature data store 422 may be populated with vulnerability result signatures discovered by organizations performing on-going browser security research (e.g., security notices posted by computer security companies), or vulnerability result signatures automatically discovered by the system based on other/similar vulnerability result signatures stored on the vulnerability result signature data store.

The web browser module 412 may be configured to open one or more web pages in a web browser context and, in the process, generate a DOM for each web page opened. To facilitate the opening of web pages in a web browser context (also referred to herein as traversing an address or URL to a web page), the web browser module 412 may receive one or more URLs\forms to web pages to be opened in a web browser context. Additionally, for some embodiments, an attack vector may be applied to a web page through the web browser module 412 by remotely controlling a web browser application in accordance with the attack vector. For various embodiments, utilization of a web browser application by the web browser module may 412 may comprise issuing a command to the web browser application and then receiving a command result from the web browser application. The web browser module 412 may comprise, or interface with, a web browser driver configured to communicate with one or more web browser applications, which may differ in type or version (e.g., Microsoft® Internet Explorer® 9, and Mozilla® Firefox® 12). As noted herein, usage of a web browser driver permits the web browser module 412 to test a web page against multiple attack vectors and across multiple web browser types/versions, thereby achieving excellent accuracy and breadth of coverage during vulnerability scanning.

The web page proxy module 414 may be configured to insert, by way of proxy injection (e.g., a proxy web service or a proxy web server), a DOM analysis script utilized during certain DOM analysis operations. To ensure that the DOM analysis script is performed before other elements of the web page are processed (e.g., malicious client-side script), the web page proxy module 414 may insert the DOM analysis script into the top most element of the web page before any other script code (e.g., beginning of the "<head>" element of a web page).

The results analysis module 416 may be configured to analyze, and possibly summarize, results (e.g., results from scan job) provided by the vulnerability scanner module 410. For example, the results analysis module 416 may receive from the vulnerability scanner module 410 the results from determining presence of a set of vulnerabilities in a set of web pages and, from those results, and provide an overall vulnerability risk assessment for the set of web pages (e.g., risk assessment based on a scan job). For some embodiments, a summary of results from the results analysis module 416 may comprise a confidence score for a particular scan job, where the confidence score indicates an accuracy level for the particular scan job. Additionally, the results analysis module 416 may provide a general risk level (e.g., high, medium, or low) for a scanned set of web pages or a scanned web site. The determination of a general risk level may be depend on a number of factors including, without limitation, the number of vulnerabilities reported (e.g., by the vulnerability scanner module 410) as being detected, the specific vulnerabilities reported as being detected, the types of vulnerabilities reported as being detect, or some combination thereof.

Figure 5:
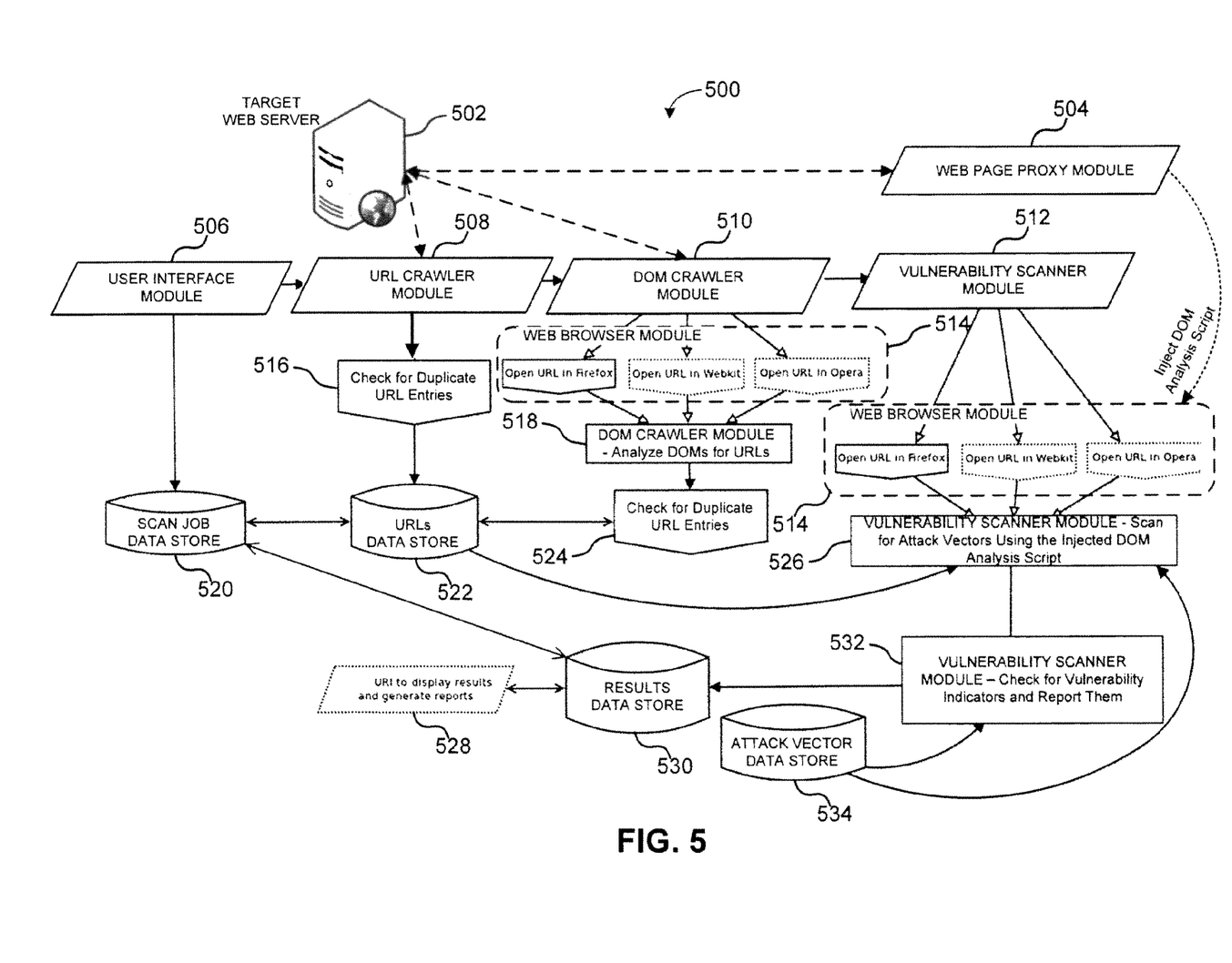
FIG. 5 is a block diagram illustrating data flow for an exemplary vulnerability testing system in accordance with some embodiments.

FIG. 5 is a block diagram illustrating data flow 500 for an exemplary vulnerability testing system in accordance with some embodiments. In FIG. 5, the data flow 500 begins with a user interface module 506 receiving a first set of universal resource locators (URLs), to a first set of web pages or HTML forms (e.g., particular web pages web pages and forms associated with one or more web sites), targeted for scanning by a vulnerability testing system. The first set of URLs received through the user interface module 506 may be stored to a universal resource locators (URLs) data store 522, for subsequent use by a universal resource locator (URL) crawler module 508, a document object model (DOM) crawler module 510 and a vulnerability scanner module 512. The first set of URLs may be associated with a scan job requested through the user interface module 506; the request for a scan job, and its associated parameters, may be stored in a scan job data store 520.

Based on user input (e.g., the URLs) received through the user interface module 506, the URL crawler module 508 may identify and store URLs (i.e., a second set of URLs) in the first set of web pages or forms (hereafter, referred to simply as "the first set of web pages") located at the first set of URLs. The URL crawler module 508 may identify the second set of URLs by "crawling" Hypertext Markup Language (HTML) links contained in the first set of web pages. The URL crawler module 508 may store the second set of URLs to the URLs data store 522 and, at operation 516, check for duplicate URL entries in the URLs data store 522 before storing a particular URL (from the second set of URLs) in the URLs data store 522. The aggregate of URLs stored in the URLs data store 522 may eventually be utilized by the DOM crawler module 510 and the vulnerability scanner module 512.

The DOM crawler module 510 may retrieve a set of URLs currently stored in the URLs data store 522, and traverse the current set of URLs to a second set of web pages. The DOM crawler module 510 may utilize a web browser module 514 to open each URL, in the current set of URLs, in a web browser application or, alternatively, to open each URL in the current set of URL in a set of web browser applications differing in type or version (e.g., a set of web browser applications comprising Microsoft® Internet Explorer® 8, Microsoft® Internet Explorer® 9, Mozilla® Firefox® 12, Apple® Safari, Webkit, and Opera®). According to some embodiments, the web browser module 514 may utilize a web browser driver to open URLs in one or more web browser application, which may differ in type or version. At operation 518, the results of opening the current set of URLs (in the one or more web browser applications) may be returned to the DOM crawler module 518 for the purpose of identifying a third set of URLs from the second set of web pages. The results received by the DOM crawler module 510 from the web browser module 514 may include a first set of document object models (DOMs) generated by the one or more web applications in association with the second set of web pages. By "crawling" the various objects and elements of the first set of DOMs, the DOM crawler module 510 may identify a third set of URLs from the first set of DOMs. In some embodiments, the process of "crawling" objects or elements associated with a DOM may entail following form elements, button elements, and the like to identify one or more URLs.

The DOM crawler module 510 may eventually store the third set of URLs to URLs data store 522 and, at operation 524, check for duplicate URL entries in the URLs data store 522 before storing a particular URL (from the third set of URLs) in the URLs data store 522. As noted herein, the aggregate of URLs stored in the URLs data store 522 may eventually be utilized by the vulnerability scanner module 512.

The vulnerability scanner module 512 may retrieve a set of URLs currently stored in the URLs data store 522, and traverse the current set of URLs to a third set of web pages. Like the DOM crawler module 510, the vulnerability scanner module 512 may utilize the web browser module 514 to open each URL, in the current set of URLs, in a web browser application. Additionally, the vulnerability scanner module 512 may utilize the web browser module 514 to open each URL in the current set of URL in a set of web browser applications differing in type or version (e.g., a set of web browser applications comprising Microsoft® Internet Explorer® 8, Microsoft® Internet Explorer® 9, Mozilla® Firefox® 12, Apple® Safari, Webkit, and Opera®).

For some embodiments, when the vulnerability scanner module 512 requests the web browser module 514 to open each URL (in the set of URLs currently stored in the URLs data store 522), the web browser module 514 may retrieve the third set of web pages (which correspond to the current set of URLs) via a web page proxy module 504. The web page proxy module 504 may be configured to insert a document object model (DOM) analysis script into the third set of web pages before they reach web browser applications controlled by the web browser 514. In some embodiments, the DOM analysis script may enable the document object model (DOM) of each web page in the third set of web pages to be monitored as attack vectors (e.g., from an attack vector data store 534) are applied to the third set of web pages during vulnerability scanning and detection at operation 526.

Subsequently, the vulnerability scanner module 512 may check the results from operation 526 for vulnerability indicators (i.e., present of vulnerabilities) and, at operation 528, report such indicators (e.g., to a test administrator) through a user reporting interface. Additionally, the vulnerability indicators may be stored to a results data store 530. The indicators stored in the results data store 530 may be associated with a scan job request stored in the scan job data store 520, and may be further analyzed for discovery of new vulnerabilities.

For some embodiments, the first, second, and third sets of web pages may be hosted and provided by a target web server 502.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 6:
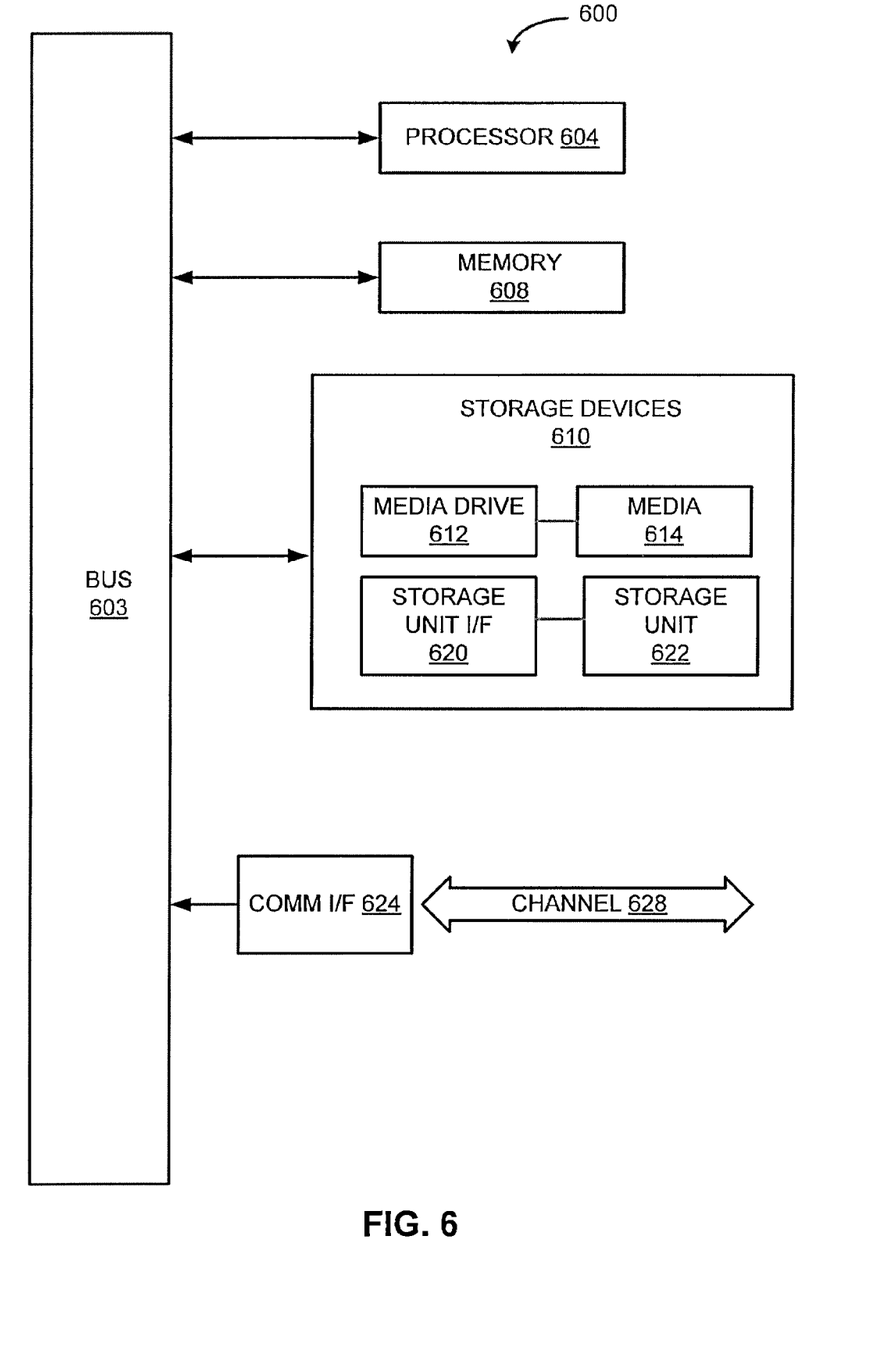
FIG. 6 is a diagram illustrating an exemplary computing module for implementing various embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the invention using other computing modules or architectures.

Referring now to FIG. 6, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for testing a vulnerability of a web site, comprising:
   receiving a first set of addresses;
   identifying a second set of addresses by analyzing a first set of web pages located at the first set of addresses;
   identifying a third set of addresses by analyzing a first set of document object models (DOMs) associated with the first set of web pages and associated with a second set of web pages located at the second set of addresses;
   probing a third set of web pages for presence of a set of vulnerabilities using a document object model (DOM) analysis script to analyze a second set of document object models (DOMs) associated with the third set of web pages as a set of attack vectors is applied to the third set of web pages, wherein the third set of web pages is located at the first, second, and third sets of addresses, and the DOM analysis script is inserted into the third set of web pages; and
   determining presence of the set of vulnerabilities for the third set of web pages based on a set of results from the probing, wherein the attack vectors are designed to exploit a vulnerability of a web page.

2. The method of claim 1, further comprising inserting the DOM analysis script into each web page in the third set of web pages before probing the third set of web pages.

3. The method of claim 1, wherein the DOM analysis script is inserted into the third set of web pages using a proxy.

4. The method of claim 1, wherein the DOM analysis script is inserted into the third set of web pages by embedding code from the DOM analysis script into code of each web page in the third set of web pages.

5. The method of claim 1, wherein the DOM analysis script is written in JavaScript.

6. The method of claim 1, wherein the DOM analysis script enables monitoring of read access or write access to a document object model (DOM) property, and the DOM property relates to a document object model (DOM) of a web page in which the DOM analysis script is inserted.

7. The method of claim 1, wherein the DOM analysis script is written in a specific scripting language, and the DOM analysis script overwrites an operation native to the specific scripting language such that inspection of a function call, defined using the specific scripting language, is enabled.

8. The method of claim 1, wherein the DOM analysis script is configured to prevent a property change to a document object model (DOM) associated with a web page in which the DOM analysis script is inserted.

9. The method of claim 1, wherein the tested vulnerability comprises a Cross-Site Scripting (XSS) vulnerability.

10. The method of claim 1, wherein the tested vulnerability comprises a document object model (DOM)-based Cross-Site Scripting (DOMXSS) vulnerability.

11. The method of claim 1, further comprising generating the first set of DOMs in association with the first and second sets of web pages by opening the first and second sets of web pages in a web browser context.

12. The method of claim 1, further comprising generating the second set of DOMs in association with the third set of web pages by opening the third set of web pages in a web browser context.

13. The method of claim 1, wherein determining the presence of the set of vulnerabilities based on the set of results comprises matching a result in the set of results with a vulnerability result signature associated with a vulnerability in the set of vulnerabilities.

14. A system for testing a vulnerability of a web site, comprising:
   a processor; and
   a non-transitory computer readable medium having instructions embedded therein, the instructions executable by a processor and configured to:
   receive a first set of addresses,
   identify a second set of addresses by analyzing the first set of web pages located at the first set of addresses, and
   identify a third set of addresses by analyzing a first set of document object models (DOMs) associated with the first set of web pages and a second set of web pages located at the second set of addresses;
   probe a third set of web pages for presence of a set of vulnerabilities using a document object model (DOM) analysis script to analyze a second set of document object models (DOMs) associated with the third set of web pages as a set of attack vectors is applied to the third set of web pages, and determine presence of the set of vulnerabilities for the third set of web pages based on a result from the probing,
wherein the third set of web pages is located at the first, second, and third sets of addresses, wherein the DOM analysis script is inserted into the third set of web pages, and wherein the attack vectors are designed to exploit a vulnerability of a web page.

15. The system of claim 14, the instructions further configured to insert, using a proxy, the DOM analysis script into each web page in the third set of web pages before probing the third set of web pages.

16. The system of claim 14, wherein the DOM analysis script is inserted into the third set of web pages by embedding code from the DOM analysis script into code of each web page in the third set of web pages.

17. The system of claim 14, wherein the DOM analysis script is written in JavaScript.

18. The system of claim 14, wherein the DOM analysis script enables monitoring of read access or write access to a document object model (DOM) property, and the DOM property relates to a document object model (DOM) of a web page in which the DOM analysis script is inserted.

19. The system of claim 14, wherein the DOM analysis script is written in a specific scripting language, and the DOM analysis script overwrites an operation native to the specific scripting language such that inspection of a function call, defined using the specific scripting language, is enabled.

20. The system of claim 14, wherein the DOM analysis script is configured to prevent a property change to a document object model (DOM) associated with a web page in which the DOM analysis script is inserted.

21. The system of claim 14, wherein the tested vulnerability comprises a Cross-Site Scripting (XSS) vulnerability.

22. The system of claim 14, wherein the tested vulnerability comprises a document object model (DOM)-based Cross-Site Scripting (DOMXSS) vulnerability.

23. The system of claim 14, the instructions further configured to generate the first set of DOMs in association with the first and second sets of web pages by opening the first and second sets of web pages in a web browser context.

24. The system of claim 14, the instructions further configured to generate the second set of DOMs in association with the third set of web pages by opening the third set of web pages in a web browser context.

25. The system of claim 14, wherein determining the presence of the set of vulnerabilities based on the set of results comprises matching a result in the set of results with a vulnerability result signature associated with a vulnerability in the set of vulnerabilities.

26. A system for testing a vulnerability of a web site, comprising:
a processor; and
a non-transitory computer readable medium having instructions embedded therein, the instructions executable by a processor and configured to:
traverse a first set of URLs to a first set of web pages, and identify a second set of universal resource locators (URLs) from the first set of web pages;
traverse the first and second sets of URLs to a second set of web pages in a web browser context such that a first set of document object models (DOMs) is generated in association with the second set of web pages, and
identify a third set of universal record locators (URLs) based on the first set of document object models (DOMs); and
traverse the first, second, and third sets of URLs to a third set of web pages in the web browser context such that a second set of document object models (DOMs) is generated in association with the third set of web pages and in context of a document object model (DOM) analysis script inserted into the third set of web pages,
probe the third set of web pages for presence of a set of vulnerabilities by using the DOM analysis script to analyze the second set of DOMs as a set of attack vectors is applied to the third set of web pages, and
determine presence of the set of vulnerabilities for the third set of web pages based on a result from the probing, wherein the attack vectors are designed to exploit a vulnerability of a web page.

27. The system of claim 26, the instructions further configured to:
traverse a universal resource locater (URL) to a target web page using a web browser application, and
provide a traversal result from the web browser application, wherein the traversal result includes a document object module (DOM) generated for the target web page.

28. The system of claim 26, the instructions further configured to:
insert the DOM analysis script into a requested web page as the requested web page is provided through the web browser context.

29. The system of claim 26, wherein the first set of DOMs is generated in association with the second set of web pages and in context of the DOM analysis script inserted into the second set of web pages.

30. The system of claim 29, the instructions further configured to:
insert the DOM analysis script into a requested web page as the requested web page is provided through the web browser context.

31. A system for testing a vulnerability of a web site, comprising:
means for receiving a first set of addresses;
means for identifying a second set of addresses by analyzing a first set of web pages located at the first set of addresses;
means for identifying a third set of addresses by analyzing a first set of document object models (DOMs) associated with the first set of web pages and associated with a second set of web pages located at the second set of addresses;
means for probing a third set of web pages for presence of a set of vulnerabilities using a document object model (DOM) analysis script to analyze a second set of document object models (DOMs) associated with the third set of web pages as a set of attack vectors is applied to the third set of web pages, wherein the third set of web pages is located at the first, second, and third sets of addresses, and the DOM analysis script is inserted into the third set of web pages; and
means for determining presence of the set of vulnerabilities for the third set of web pages based on a set of results from the probing, wherein the attack vectors are designed to exploit a vulnerability of a web page.

* * * * *